United States Patent
Endler et al.

(10) Patent No.: US 8,795,110 B2
(45) Date of Patent: Aug. 5, 2014

(54) DISK SET ARRANGEMENT FOR A CHAIN-CVT HAVING A FUNCTION-OPTIMIZED DISK SET CONTOUR

(75) Inventors: Thomas Endler, Rheinmünster (DE); Nicolas Rickling, Offendorf (FR)

(73) Assignee: Schaeffler Technologies GmbH & Co. KG, Herzogenaurach (DE)

(*) Notice: Subject to any disclaimer, the term of this patent is extended or adjusted under 35 U.S.C. 154(b) by 529 days.

(21) Appl. No.: 13/068,156

(22) Filed: May 3, 2011

(65) Prior Publication Data
US 2011/0281675 A1  Nov. 17, 2011

(30) Foreign Application Priority Data

Nov. 3, 2008 (DE) .......................... 10 2008 054 327
Jan. 15, 2009 (DE) .......................... 10 2009 004 708
Oct. 29, 2009 (WO) ............... PCT/DE2009/001533

(51) Int. Cl.
*F16H 55/56* (2006.01)
*F16H 9/18* (2006.01)
*F16H 61/662* (2006.01)

(52) U.S. Cl.
USPC .............................................................. 474/8

(58) Field of Classification Search
None
See application file for complete search history.

(56) References Cited

U.S. PATENT DOCUMENTS

| | | | | |
|---|---|---|---|---|
| 4,631,042 | A * | 12/1986 | Rattunde | 474/8 |
| 5,328,412 | A * | 7/1994 | Durum | 474/8 |
| 6,293,887 | B1 * | 9/2001 | Linnenbrugger et al. | 474/245 |
| 6,416,433 | B1 * | 7/2002 | Linnenbrugger | 474/8 |
| 2006/0058143 | A1 | 3/2006 | Rickling et al. | 474/215 |

FOREIGN PATENT DOCUMENTS

| | | |
|---|---|---|
| DE | 100 03 131 A1 | 8/2000 |
| DE | 102 35 342 A1 | 2/2004 |
| DE | 10 2005 037 941 A | 3/2006 |
| EP | 1 441 151 A2 | 7/2004 |
| GB | 2 169 043 A | 7/1986 |
| JP | 2002031215 A | 1/2002 |
| WO | WO 2006/049493 A1 | 5/2006 |
| WO | WO 2007/055560 A1 | 5/2007 |

* cited by examiner

*Primary Examiner* — William E Dondero
*Assistant Examiner* — Mark K Buse
(74) *Attorney, Agent, or Firm* — Alfred J. Mangels

(57) ABSTRACT

A disk set arrangement for a chain-CVT having a function-optimized disk set surface contour. The CVT includes a first drive disk set and a second driven disk set, wherein the disk sets of the disk set arrangement in each case include two disks mounted on respective shafts. One disk of each of the disk sets can be displaced axially relative to an opposed axially fixed disk. An endless chain arrangement with rocker pressure pieces is operative between the disk sets to transmit torque. The rocker pressure pieces have longitudinal axes that extend parallel to the rotational axes of the shafts, and include outer axial ends that contact the contoured disk surfaces.

13 Claims, 2 Drawing Sheets

DISK SET ARRANGEMENT FOR A CHAIN-CVT HAVING A FUNCTION-OPTIMIZED DISK SET CONTOUR

BACKGROUND OF THE INVENTION

1. Field of the Invention

The present invention relates to a disk set arrangement with a first drive disk set and a second driven disk set for a chain-CVT with a function-optimized disk set contour.

2. Description of the Related Art

DE 10 2005 037 941 A1 discloses a belt and pulley transmission that essentially includes a drive- and a driven disk set, wherein each disk set has an axially fixed disk and an axially movable disk, respectively disposed on a drive- or a driven shaft and connected together by means of a chain arrangement for torque transmission.

At present, disk sets with curved-surface disks and a chain having rocker pins of the chain arrangement with matching contours are known on the one hand, and straight-surface disk sets—that is—disks whose flanks do not feature curvature are known on the other hand.

Since the disk set angle between the smallest and the largest running radius of disk sets with curved-surface disks change depends on the chosen radius of the disk set, the problem is that, when dimensioning the adapted chain contour, attention must be paid to ensure that so-called edge supports do not occur, and hence intensified tribological loading—because the pressure ellipse does not fully lie on the rocker pin of the chain arrangement.

One problem with disk sets having straight surfaced disks is that more support is required to hold the disks in position against the pressure exerted by the chain arrangement, whereby the support requirement differs between the smallest support in under-drive and maximum support in over-drive. This is inconvenient in both cases for sizing the power requirements of the hydraulic system. Moreover, straight-surface disk sets lead to increased track displacement.

An object of the present invention is therefore to design a disk set such that its disks combine the advantages of a straight-surface disk set with those of a curved-surface disk set.

SUMMARY OF THE INVENTION

That object is met by means of a disk set arrangement with a first, drive disk set and a second, driven disk set for a chain-CVT with a function-optimized disk set contour. The disk set arrangement includes two axially movable disks on respective shafts, and a chain arrangement with rocker pins acting between the disks, and whose longitudinal axes extend parallel to the axis of rotation of the shaft. In that case, the curvature of the disks, at least of one of the disk sets is determined by a ratio between the eccentricity of the disk curvature and the disk set radius, which ranges from 0.16 to 0.20. The eccentricity of disk curvature is determined by a point that is spaced from the axis of rotation of the disks by the magnitude of a first distance running perpendicularly to the axis of rotation of the disks, and is measured from the disk set radius determining the curvature of the sides of the disks facing one another, wherein the disk set radius runs across the axis of rotation. The curvature of the rocker pins is determined by a first ratio between a first eccentricity of the rocker pins and a first rocker pin radius that lies in a range from 0.185 to 0.205. The first rocker pin radius is measured from a first point that is distanced by a magnitude of the first stretch perpendicularly from the longitudinal axis of the rocker pins, and is determined by a second ratio that consists of a second eccentricity of the rocker pins and a second rocker pin radius in the azimuthal direction and ranges from 0 to 0.015, whereby the second rocker pin radius is measured from a second point that is spaced by a magnitude of an extent corresponding to the second eccentricity of the rocker pins from the longitudinal axis, and which runs perpendicularly to the longitudinal axis as well as perpendicularly to the first extent.

The essential advantage of the present invention is that the disks of the present disk sets with function-optimized contour are formed such that the advantages of curved-surface disk sets that require less track displacement and less support, particularly in overdrive, and facilitate low pressures and hence the combination of low power requirements by the hydraulic system with those of straight-surface disk sets, particularly with respect to the variator efficiency.

The eccentricity of disk curvature is particularly preferred in a range of from 895 mm to 905 mm, in particular 900 mm. The disk set radius lies preferably between 2000 mm and 10000 mm, particularly between 4000 mm and 6000 mm. For a particularly preferred embodiment, it is 5000 mm.

The curvature of the rocker pins is preferably determined by an extent of 39.19 mm corresponding to the first eccentricity of the rocker pins, and a first rocker pin radius of 200 mm and an extent of 0.35 mm, and a second rocker pin radius of 80 mm corresponding to the second eccentricity of the rocker pins.

In correspondence with an embodiment of the invention, both the disks of the drive disk set as well as the disks of the driven disk set are provided with a function-optimized contour.

A disk set can also be advantageously combined with a function-optimized contour with a straight-surface disk set in a variator. For instance, the disks of the drive disk set are provided with curvature according to the invention, whereas the disks of the driven disk set are straight-surfaced in shape and vice versa. The first combination is preferred since the drive disk set dominates the efficiency due to reduced contact pressure demand, and the driven disk set often has the greatest influence on the acoustics of the transmission. The disk set arrangement with the straight-surface disk set in the driven set features the greatest advantages in most cases.

Even when a curved-surface disk set with function-optimized contour is combined with a straight-surface disk set in a variator, the torque transmission between the disk sets occurs by means of a chain with rocker pins adapted to the curved-surface disk set.

For the straight-surface disk sets, flank angles of approx. 11° are preferred, which means that the two disks of such a disk set feature an opening angle of approx. 22°.

The pulley arrangement includes an axially fixed disk and an axially movable disk.

BRIEF DESCRIPTION OF THE DRAWINGS

In the following description the invention and its embodiments are explained in detail in connection with the figures. Shown are.

DESCRIPTION OF THE PREFERRED EMBODIMENTS

Figure 3:
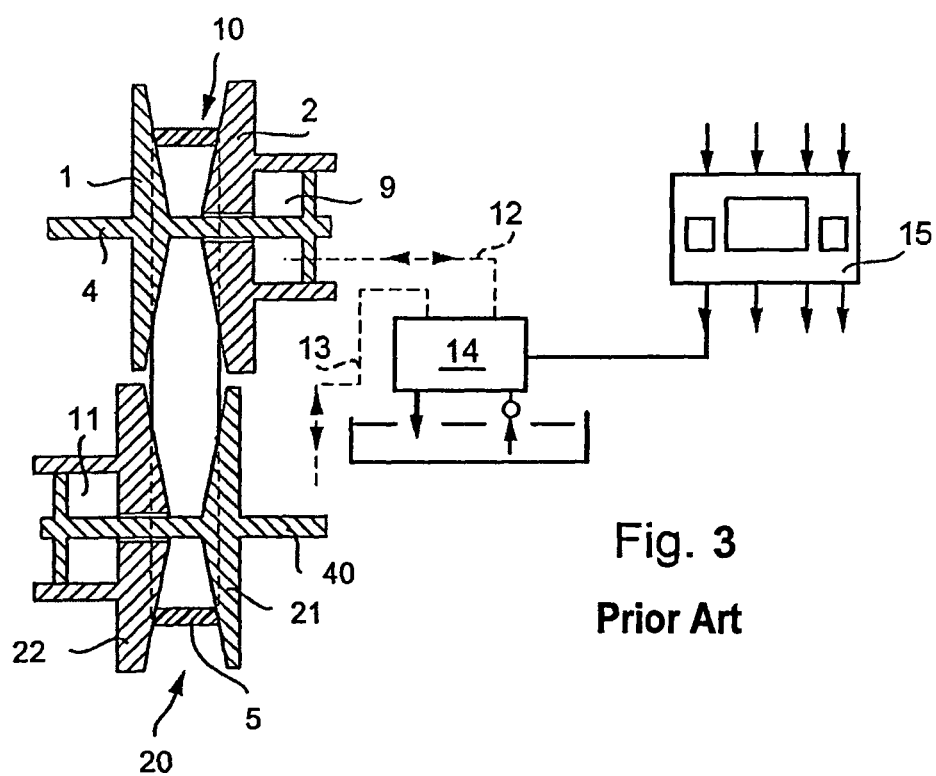
FIG. 3 is a schematic principle depiction of a known belt and pulley transmission with associated control device.

FIG. 3 will enable a better understanding of the invention and a clarification of terminology, and is based upon a belt and pulley transmission (chain-CVT) according to the prior art. The chain-CVT includes two pulley pairs, namely a drive disk set 10, and a driven disk set 20. An axially fixed disk 1 of the drive disk set 10 is connected rigidly with an input shaft 4, which is driven, for instance, by an internal combustion engine. An axially fixed disk 21 of the other disk set, namely of the driven disk set 20, is connected rigidly with an output shaft 40 that drives the vehicle. The other disk, namely an axially movable disk 2 of the drive disk set 10 is connected non-rotatably, although it is axially displaceable, with the input shaft 4. The other disk 22 of the driven disk set 20 is connected non-rotatably, and is axially displaceable, with the output shaft 40.

An endless torque-transmitting means, for instance a chain arrangement 5, runs around both disk sets 10 and 20 in frictional engagement with the disk surfaces facing one another. Through opposite adjustment of the axial distances between the two disks of the disk sets, the speed ratio is changed between the two pairs of pulleys and thus also the transmission ratio of the transmission unit. Transmission adjustment is served, for instance, by pressure chambers 9 and 11 that are connected via hydraulic lines 12 and 13 with a control valve unit 14, by means of which the pressure chambers 9 and 11 are pressurized in a controllable manner with hydraulic fluid for transmission adjustment. A control device 15 serves the activation of the control valve unit 14, and contains a microprocessor with corresponding memory devices, and whose inputs, for instance, are connected with a selecting lever for activating the transmission, a pedal, speed sensors etc., and whose outputs, for instance, are connected with a clutch, a power positioning element of the engine—not shown—and of the control valve unit 14. The design and function of a belt and pulley transmission are known and are therefore not explained further.

Figure 1:
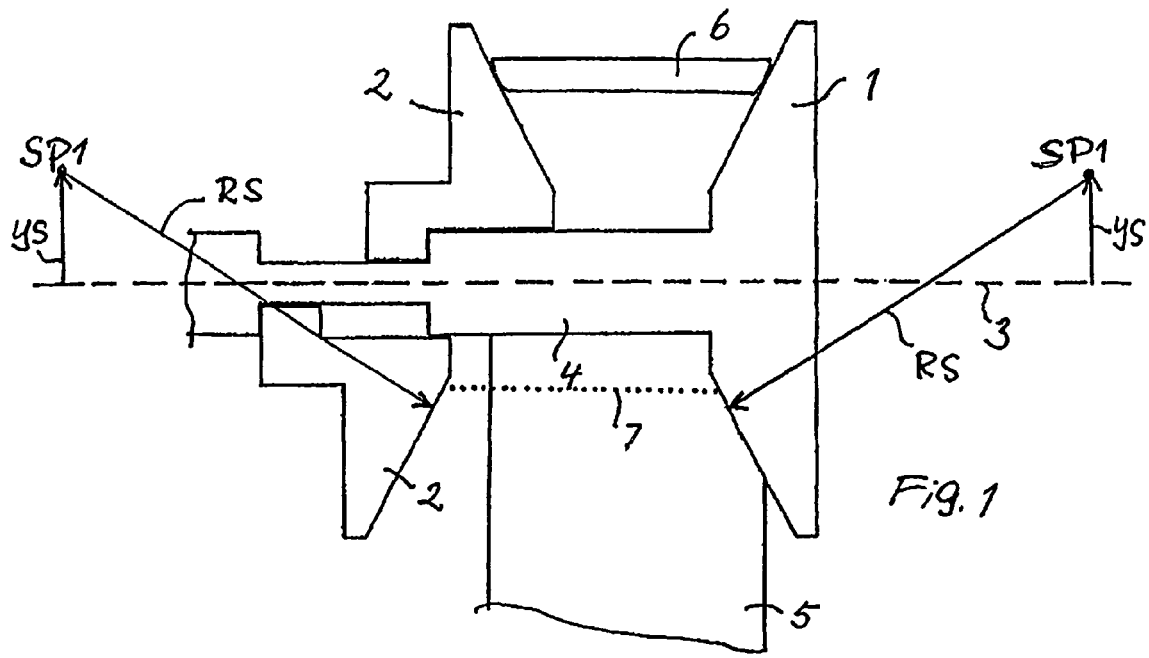
FIG. 1 is a schematic depiction of a drive disk set illustrating the contours of the disks, FIG. 2 Is a schematic depiction for illustrating the contour of the rocker pins.

FIG. 1 schematically shows a drive disk set with a function-optimized contour for a chain-CVT (continuous variable transmission), which essentially includes an axially fixed disk 1 and an axially movable disk 2. In FIG. 1, above the axis of rotation 3 of the shaft 4, the axially movable disk 2 is depicted in the position next to the axially fixed disk 1, and below the axis of rotation 3 of the shaft 4, the axially movable disk 2 is depicted in the position farthest away from axially fixed disk 1. The chain arrangement shown between the axially fixed disk 1 and the axially movable disk 2 is designated by 5. In that case, a rocker pin 6 of the chain arrangement 5 is particularly depicted in a side view.

In the position of the axially movable disk 2 as depicted above the axis of rotation 3 of the shaft 4, the rocker pins 6 are located in the overdrive position, whereas the dotted line 7 below the axis of rotation 3 of the shaft 4 shows the location of the rocker pins 6 in the under-drive position.

The disk set arrangement, described thus far, is known.

The present invention relates to the hardware representation of the disk contour of the axially fixed disk 1 as well as of the axially movable disk 2 of the present disk set, as well as the adapted contour of the rocker pins 6 of the chain arrangement 5.

For the designation of the above-mentioned disk set contour, the disk set radius RS of curvature as well as the eccentricity YS of the disk set curvature are controlling for the axially fixed disk 1 as well as for the axially movable disk 2. In that case, the disk set radius of curvature is measured from a center point SP1, which is a distance away, measured from the axis of rotation and corresponding to the eccentricity YS, perpendicular to the axis of rotation 3. In that case, the disk set radius RS extends across the axis of rotation.

In accordance with the invention, the ratio between the eccentricity YS and the disk set radius RS is in a range of from 0.16 to 0.20. The eccentricity YS is preferably from about 895 mm to about 905 mm, especially 900 mm. The disk set radius RS is preferably from about 2000 mm to about 10000 mm, especially 4000 mm to 6000 mm; it is preferably 5000 mm.

Figure 2:
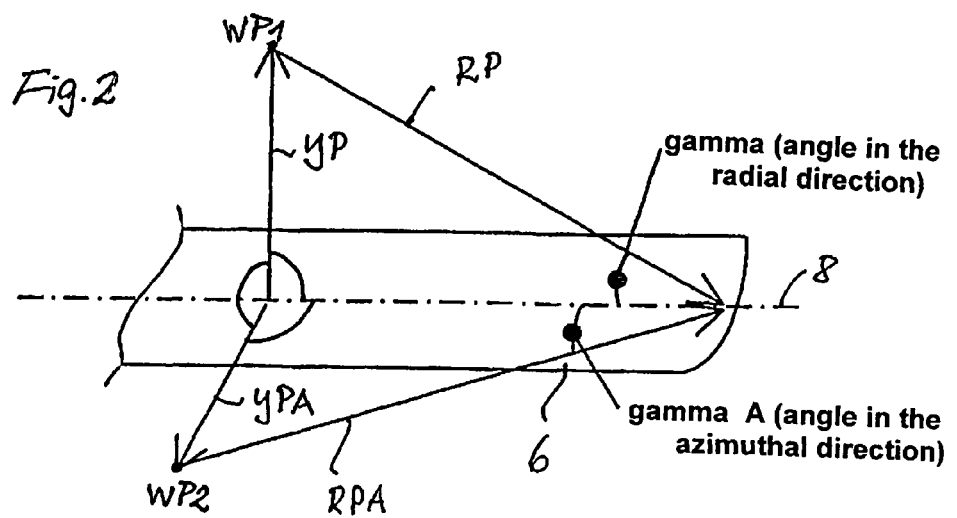

FIG. 2 shows the contour of the axial ends of rocker pins 6 of the chain arrangement 5 adapted to the disk set contour of the axially fixed disk 1 and of the axially movable disk 2. In that case, the curvature of the axial ends of rocker pins 6 is determined by a first rocker pin end radius RP and a second rocker pin end radius RPA. The first rocker pin end radius RP is measured from a first point WP1, which corresponds to a first eccentricity YP, and is spaced by the magnitude of a first distance running perpendicularly from the longitudinal axis 8 of the rocker pins 6. The second rocker pin end radius RPA, running in the azimuthal direction, is measured from a second point WP2, which corresponds to a second eccentricity YPA from the longitudinal axis 8 of the rocker pins, and is spaced by the magnitude of a second distance that runs perpendicular to the longitudinal axis 8, and moreover runs perpendicularly to the first distance.

In accordance with the invention, the ratio between the first eccentricity YP and the first rocker pin end radius RP ranges from about 0.185 to about 0.205, and the ratio between the second eccentricity YPA and the second rocker pin end radius RPA lies between 0 and about 0.015. It is especially preferred that the first rocker pin end radius RP is 200 mm and the second rocker pin end radius is 39.19 mm. That corresponds to an angle γ in the radial direction between the longitudinal axis 8 and the distance YP of 11.30°. The second eccentricity is preferably YPA 0.35 mm and the second rocker pin end radius RPA is 80 mm. That corresponds to an angle γA in the azimuthal direction of 0.25°.

What we claim is:

1. A disk set arrangement for a chain CVT with a function-optimized disk set contour, said disk set comprising: a first drive disk set and a second driven disk set, wherein each of the disk sets of the disk set arrangement includes two disks mounted on a respective shaft and one of the disks of each disk set is axially movable relative to an opposed axially fixed disk, a chain having rocker pins that extend between and that contact opposed surfaces of the disks of the disk sets, wherein the rocker pins have longitudinal axes that extend parallel to axes of rotation of the shafts, wherein a curvature of opposed surfaces of the disks of at least of one of the disk sets is defined by a ratio between an eccentricity distance of a center point of a radius defining the disk surface curvature, wherein the eccentricity distance is relative to the longitudinal axis of the associated shaft of the disk surface curvature and the length of the disk set radius of curvature, which ratio lies in a range of from about 0.16 to about 0.20, wherein the eccentricity of the disk surface curvature is determined by a disk surface radius of curvature center point spaced from the axis of rotation of the disks and from which point the curvature of the surfaces of the disks facing one another of the related disk set radius is measured, whereby the disk surface radius of curvature extends across the axis of rotation, and wherein a first curvature of axial ends of the rocker pins is determined by a first ratio between a first eccentricity relative to the longitudinal axis of the rocker pins and a first rocker pin axial end radius of curvature, which ratio lies in a range between about 0.185 and about 0.205, wherein a first rocker pin axial end radius of curvature is measured from a first center point spaced in a radial direction from the rocker pin longitudinal axis, and wherein a second curvature of the axial ends of the rocker pins is determined by a second ratio between a second eccentricity relative to the longitudinal axis of the rocker pins and a second rocker pin axial end radius of curvature in the azimuthal direction, which second ratio lies in a range of from 0 and about 0.015, wherein the second rocker pin axial end radius of curvature is measured from a second center point spaced in an azimuthal direction from the rocker pin longitudinal axis, which azimuthal direction runs perpendicularly to the rocker pin longitudinal axis and perpendicularly to the radial direction of the first center point.

2. The disk set arrangement according to claim 1, wherein the eccentricity of the disk surface curvature lies in a range of from about 895 mm to about 905 mm.

3. The disk set arrangement according to claim 2, wherein the eccentricity is 900 mm.

4. The disk set arrangement according to claim 1, wherein the disk surface radius of curvature lies between about 2000 mm and about 10000 mm.

5. The disk set arrangement according to claim 4, wherein the disk surface radius of curvature of the at least one disk set ranges from about 4000 mm to about 6000 mm.

6. The disk set arrangement according to claim 5, wherein the disk surface radius of curvature of the at least one disk set is 5000 mm.

7. The disk set arrangement according to claim 1, wherein the curvature of the axial ends of the rocker pins is determined by a distance of 39.19 mm relative to the longitudinal axis of the rocker pins corresponding to the first eccentricity of the rocker pins and a first rocker pin radius of curvature of 200 mm, and by a distance of 0.35 mm relative to the longitudinal axis of the rocker pins corresponding to the second eccentricity of the rocker pins and a second rocker pin radius of curvature of 80 mm.

8. The disk set arrangement according to claim 1, wherein the surface curvature of the opposed disk surfaces of the first drive disk set and the surface curvature of the opposed disk surfaces of the second driven disk set are each function-optimized to have curved opposed disk surfaces.

9. A chain-CVT transmission, including a disk set arrangement according to claim 1.

10. A disk set arrangement for a chain CVT with a function-optimized disk set contour, said disk set comprising: a first drive disk set and a second driven disk set, wherein each of the disk sets of the disk set arrangement includes two disks mounted on a respective shaft and one of the disks of each disk set is axially movable relative to an opposed axially fixed disk, a chain having rocker pins that extend between and that contact opposed surfaces of the disks of the disk sets, wherein the rocker pins have longitudinal axes that extend parallel to axes of rotation of the shafts, wherein a curvature of opposed surfaces of the disks of at least of one of the disk sets is determined by a ratio between an eccentricity relative to the longitudinal axis of the associated shaft of the disk surface curvature and the length of the disk set radius of curvature, which ratio lies in a range of from about 0.16 to about 0.20, wherein the eccentricity of the disk surface curvature is determined by a disk surface radius of curvature center point spaced from the axis of rotation of the disks and from which point the curvature of the surfaces of the disks facing one another of the related disk set radius is measured, whereby the disk surface radius of curvature extends across the axis of rotation, wherein a first curvature of axial ends of the rocker pins is determined by a first ratio between a first eccentricity relative to the longitudinal axis of the rocker pins and a first rocker pin axial end radius of curvature, which ratio lies in a range between about 0.185 and about 0.205, wherein a first rocker pin axial end radius of curvature is measured from a first center point spaced in a radial direction from the rocker pin longitudinal axis, and wherein a second curvature of the axial ends of the rocker pins is determined by a second ratio between a second eccentricity relative to the longitudinal axis of the rocker pins and a second rocker pin axial end radius of curvature in the azimuthal direction, which second ratio lies in a range of from 0 and about 0.015, wherein the second rocker pin axial end radius of curvature is measured from a second center point spaced in an azimuthal direction from the rocker pin longitudinal axis, which azimuthal direction runs perpendicularly to the rocker pin longitudinal axis and perpendicularly to the radial direction, and wherein the surface curvature of opposed disk surfaces of the first drive disk set is function-optimized to have curved opposed disk surfaces, and the opposed disk surfaces of the second driven disk set have straight disk surfaces.

11. The disk set arrangement according to claim 10, wherein an angle between the straight disk surfaces and a perpendicular to the axis of rotation of the disk set is between about 9° and about 13°.

12. The disk set arrangement according to claim 10, wherein an angle between the straight disk surfaces and a perpendicular to the axis of rotation of the disk set is 11°.

13. A disk set arrangement for a chain CVT with a function-optimized disk set contour, said disk set comprising: a first drive disk set and a second driven disk set, wherein each of the disk sets of the disk set arrangement includes two disks mounted on a respective shaft and one of the disks of each disk set is axially movable relative to an opposed axially fixed disk, a chain having rocker pins that extend between and that contact opposed surfaces of the disks of the disk sets, wherein the rocker pins have longitudinal axes that extend parallel to axes of rotation of the shafts, wherein a curvature of opposed surfaces of the disks of at least of one of the disk sets is determined by a ratio between an eccentricity relative to the longitudinal axis of the associated shaft of the disk surface curvature and the length of the disk set radius of curvature, which ratio lies in a range of from about 0.16 to about 0.20, wherein the eccentricity of the disk surface curvature is determined by a disk surface radius of curvature center point spaced from the axis of rotation of the disks and from which point the curvature of the surfaces of the disks facing one another of the related disk set radius is measured, whereby the disk surface radius of curvature extends across the axis of rotation, wherein a first curvature of axial ends of the rocker pins is determined by a first ratio between a first eccentricity relative to the longitudinal axis of the rocker pins and a first rocker pin axial end radius of curvature, which ratio lies in a range between about 0.185 and about 0.205, wherein a first rocker pin axial end radius of curvature is measured from a first center point spaced in a radial direction from the rocker pin longitudinal axis, and wherein a second curvature of the axial ends of the rocker pins is determined by a second ratio between a second eccentricity relative to the longitudinal axis of the rocker pins and a second rocker pin axial end radius of curvature in the azimuthal direction, which second ratio lies in a range of from 0 and about 0.015, wherein the second rocker pin axial end radius of curvature is measured from a second center point spaced in an azimuthal direction from the rocker pin longitudinal axis, which azimuthal direction runs perpendicularly to the rocker pin longitudinal axis and perpendicularly to the radial direction, and wherein the opposed surfaces of the disks of the first drive disk set are straight disk surfaces and the opposed surfaces of the disks of the second driven disk set are function-optimized to have curved opposed disk surfaces.

* * * * *